US012620789B2

(12) United States Patent
Gwaltney et al.

(10) Patent No.: US 12,620,789 B2
(45) Date of Patent: May 5, 2026

(54) NESTABLE WIRING DUCT

(71) Applicant: ABB SCHWEIZ AG, Baden (CH)

(72) Inventors: Jonathan Jay Gwaltney, Fayette, TN (US); Dustin Bobbitt, Olive Branch, MS (US)

(73) Assignee: ABB SCHWEIZ AG, Baden (CH)

( * ) Notice: Subject to any disclaimer, the term of this patent is extended or adjusted under 35 U.S.C. 154(b) by 168 days.

(21) Appl. No.: 18/424,057

(22) Filed: Jan. 26, 2024

(65) Prior Publication Data

US 2025/0246886 A1     Jul. 31, 2025

(51) Int. Cl.
*H02G 3/04* (2006.01)

(52) U.S. Cl.
CPC ........... *H02G 3/0418* (2013.01); *H02G 3/045* (2013.01)

(58) Field of Classification Search
None
See application file for complete search history.

(56) References Cited

U.S. PATENT DOCUMENTS

| | | | | | |
|---|---|---|---|---|---|
| 800,054 | A | * | 9/1905 | Ayres | H02G 3/0418 |
| | | | | | 174/101 |
| 3,321,571 | A | * | 5/1967 | Lynch | H02G 3/045 |
| | | | | | 174/101 |
| 4,136,257 | A | * | 1/1979 | Taylor | H02G 3/045 |
| | | | | | 174/72 A |
| 4,942,271 | A | * | 7/1990 | Corsi | H02G 3/0418 |
| | | | | | 174/101 |

| | | | | | |
|---|---|---|---|---|---|
| 6,380,484 | B1 | * | 4/2002 | Theis | F16L 3/26 |
| | | | | | 174/101 |
| 6,903,265 | B1 | * | 6/2005 | VanderVelde | H02G 3/0418 |
| | | | | | 174/68.3 |
| 7,408,113 | B1 | | 8/2008 | Caveney et al. | |
| 7,559,340 | B2 | * | 7/2009 | Ikeda | H02G 3/0475 |
| | | | | | 59/900 |
| 7,655,862 | B2 | * | 2/2010 | Caveney | H02G 3/0418 |
| | | | | | 174/68.3 |
| 8,957,310 | B2 | * | 2/2015 | Kaihotsu | H02G 3/04 |
| | | | | | 138/155 |
| 9,576,705 | B2 | * | 2/2017 | Shin | H01B 9/006 |
| 11,539,194 | B2 | * | 12/2022 | Lewinski | H02G 3/045 |
| 2007/0062732 | A1 | * | 3/2007 | Benito-Navazo | H02G 3/045 |
| | | | | | 174/481 |
| 2009/0200057 | A1 | * | 8/2009 | Caveney | H02G 3/045 |
| | | | | | 174/101 |
| 2012/0152588 | A1 | * | 6/2012 | Asztalos | H05K 9/0007 |
| | | | | | 174/68.3 |

(Continued)

FOREIGN PATENT DOCUMENTS

| | | |
|---|---|---|
| JP | 2001037039 A | 2/2001 |
| KR | 101594125 B1 | 2/2016 |

*Primary Examiner* — Krystal Robinson
(74) *Attorney, Agent, or Firm* — Greenberg Traurig, LLP

(57)     ABSTRACT

A duct may include a first sidewall including a first end and a second end opposite the first end. A duct may include a second sidewall including a third end and a fourth end opposite the third end. A duct may include a back wall, wherein the back wall includes a plurality of segments joined together at one or more bend lines, wherein the first end extends from the back wall, wherein the third end extends from the back wall, wherein in an uninstalled configuration, a first length from the second end to the fourth end is greater than a second length from the first end to the third end.

20 Claims, 8 Drawing Sheets

(56)          References Cited

U.S. PATENT DOCUMENTS

2012/0247829 A1* 10/2012 Caveney ................ H02G 3/105
                                                    174/88 R
2018/0001840 A1*  1/2018 Talebpour ............... F16B 5/128
2020/0313409 A1* 10/2020 Lewinski ............. H02G 3/0437

* cited by examiner

NESTABLE WIRING DUCT

FIELD

This disclosure relates generally to a duct for routing wires. More particularly, this disclosure relates to a duct for routing wires in a control panel enclosure.

BACKGROUND

Wire ducts are often used to route wires in an enclosure such as a control panel. Typically, rectangular ducts are used to route wires inside the enclosure. Rectangular ducts are not easily stackable when being stored or in transport prior to being installed in an enclosure.

SUMMARY

In some embodiments, a duct for routing wires in an enclosure includes a first sidewall including a first end and a second end opposite the first end. In some embodiments, a second sidewall includes a third end and a fourth end opposite the third end. In some embodiments, the duct includes a back wall. In some embodiments, the back wall includes a plurality of segments joined together at one or more bend lines. In some embodiments, the first end extends from the back wall. In some embodiments, the third end extends from the back wall. In some embodiments, in an uninstalled configuration, a first length from the second end to the fourth end is greater than a second length from the first end to the third end.

In some embodiments, the first sidewall, the second sidewall, and the back wall are formed of a single piece, unitary construction.

In some embodiments, in the uninstalled configuration, the back wall is in a dome shape.

In some embodiments, in the uninstalled configuration, the back wall is in an inverted V shape.

In some embodiments, in an installed configuration, the first length and the second length are equal.

In some embodiments, the back wall is flexible to transition from the uninstalled configuration to an installed configuration.

In some embodiments, in the installed configuration, the first sidewall is perpendicular to the back wall and the second sidewall is perpendicular to the back wall.

In some embodiments, in the installed configuration, the first sidewall is parallel to the second sidewall.

In some embodiments, the duct is made of a thermoplastic.

In some embodiments, the duct is made of a polyvinyl chloride (PVC), a halide free poly (p-phenylene oxide) (PPO), a halide free polyphenylene sulfide (PPS), or combination thereof.

In some embodiments, the first sidewall includes a plurality of fingers.

In some embodiments, the second sidewall includes a plurality of fingers.

In some embodiments, a duct for routing wires in an enclosure includes a first sidewall including a first end and a second end opposite the first end; a second sidewall including a third end and a fourth end opposite the third end; and a back wall. In some embodiments, the back wall includes a plurality of apertures configured to receive a fastener during installation of the duct. In some embodiments, the back wall is configured to flex between an uninstalled configuration and an installed configuration. In some embodiments, the first end extends from the back wall. In some embodiments, the third end extends from the back wall. In some embodiments, the first sidewall, the second sidewall, and the back wall are formed of a single piece, unitary construction. In some embodiments, in an uninstalled configuration, a first length from the second end to the fourth end is greater than a second length from the first end to the third end.

In some embodiments, in the uninstalled configuration, the back wall is in a dome shape.

In some embodiments, in the uninstalled configuration, the back wall is in an inverted V shape.

In some embodiments, in an installed configuration, the first length and the second length are equal.

In some embodiments, the back wall is flexible to transition from the uninstalled configuration to an installed configuration.

In some embodiments, the first sidewall is perpendicular to the back wall and the second sidewall is perpendicular to the back wall.

In some embodiments, in the installed configuration, the first sidewall is parallel to the second sidewall.

In some embodiments, the duct is made of a thermoplastic.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Wire ducts are often used to route wires in an enclosure such as a control panel. Typically, the ducts may be rectangular in shape. The rectangular ducts are used to route wires inside the enclosure. Rectangular ducts are not easily stackable when being stored or in transport prior to being installed in an enclosure. Up to the point of installation, the rectangular ducts are bulky and waste volume compared to the number of ducts that are being stored or transported. In some instances, some rectangular ducts have been made to flatten out, but require additional components to hold the sides in place during use. In other instances, the rectangular ducts require additional components for separating the duct into multiple pieces. In such instances, the existing solutions require additional assembly steps.

Embodiments of this disclosure are directed to nestable wiring ducts that can be stacked together and that automatically transition to their final shape when fastened to a mounting surface (i.e., when installed in an enclosure). The embodiments of this disclosure do not require any separate components to hold the side walls of the duct in position. No additional pre-assembly steps are required between storage, transport, and installation. As a result, embodiments disclosed herein can reduce the amount of wasted space as well as avoid additional steps. When the nestable wiring ducts of the present disclosure are secured to an enclosure, the nestable wiring ducts are placed into their final form.

Figure 1:
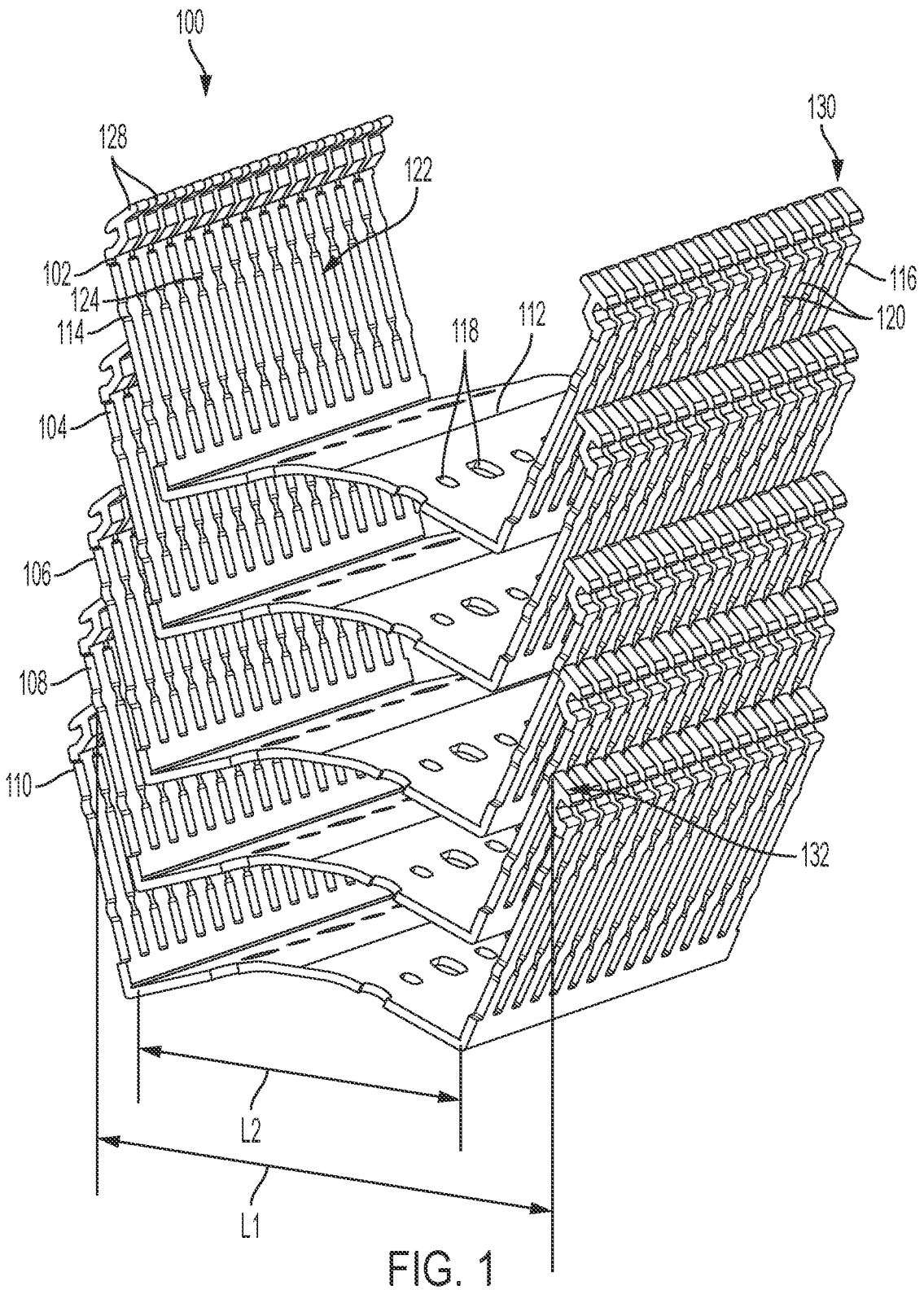
FIG. 1 shows a perspective view of a plurality of wiring ducts, according to some embodiments.

FIG. 1 shows a perspective view of a plurality of wiring ducts 100, according to some embodiments. In the illustrated embodiment, the plurality of wiring ducts 100 are shown in a stacked configuration.

In some embodiments, the plurality of wiring ducts 100 includes a first wiring duct 102, a second wiring duct 104, a third wiring duct 106, a fourth wiring duct 108, and a fifth wiring duct 110. In the illustrated embodiment, five of the plurality of wiring ducts 100 are shown in the stacked configuration. It is to be appreciated that the number of the plurality of wiring ducts 100 shown is an example and that the number of the plurality of wiring ducts 100 that are stacked can vary beyond five. For example, in some embodiments, more than five of the plurality of wiring ducts 100 can be stacked together and in some embodiments, fewer than five of the plurality of wiring ducts 100 can be stacked together. In some embodiments, the configuration shown enables the plurality of wiring ducts 100 to be stored, transported, or combinations thereof in a more efficient manner than wiring ducts that are not nestable.

In some embodiments, each of the plurality of wiring ducts 100 includes a first wall 112, a second wall 114, and a third wall 116. In some embodiments, the first wall 112 can be referenced as a back wall or a base. In some embodiments, the second wall 114, and the third wall 116 can be referenced as sidewalls. In some embodiments, an end of the second wall 114 extends from the first wall 112 and an opposite end of the second wall 114 can be a free end of the second wall 114. In some embodiments, an end of the third wall 116 extends from the first wall 112 and an opposite end of the third wall 116 can be a free end of the third wall 116.

In some embodiments, the first wall 112 includes a plurality of apertures 118. In some embodiments, the plurality of apertures 118 can be configured to receive a fastener (not shown) when each of the plurality of wiring ducts 100 are installed within an enclosure (e.g., a control panel or the like). In some embodiments, when installed, each of the plurality of wiring ducts 100 are transitioned to a state in which the geometry of the wiring duct is modified (see FIG. 2 and corresponding description below).

In some embodiments, the second wall 114 and the third wall 116 can be a continuous piece of material. In the illustrated embodiment, the second wall 114 and the third wall 116 can include a plurality of fingers 120. In some embodiments, each of the plurality of fingers 120 can be divided into a plurality of slots 122. In some embodiments, the plurality of fingers 120 can be removable (e.g., can be snapped off if wanted) from the plurality of wiring ducts 100. Each of the plurality of fingers 120 can include a protrusion 124 that separates the plurality of slots 122.

In some embodiments, each of the plurality of fingers 120 includes a flange 128 at a free end 130 of the plurality of fingers 120. In some embodiments, the flange 128 can be used to engage a cover (not shown) for each of the plurality of wiring ducts 100 when installed in an enclosure (e.g., a control panel or the like). In such embodiments, the cover can be used to cover the wires running through the plurality of wiring ducts 100.

In some embodiments, the plurality of wiring ducts 100 can be extruded. In some embodiments, the plurality of wiring ducts 100 can each be formed of a single piece, unitary construction. In some embodiments, the plurality of wiring ducts 100 can be made of a thermoplastic. In some embodiments, the plurality of wiring ducts 100 can be made of a polyvinyl chloride (PVC), a halide free poly (p-phenylene oxide) (PPO), a halide free polyphenylene sulfide (PPS), suitable combinations thereof, or the like.

In some embodiments, a major length of the plurality of wiring ducts 100 can be 6 feet. It is to be appreciated that this is an example and that the length of the plurality of wiring ducts 100 can be greater than 6 feet in some embodiments or less than 6 feet in other embodiments.

In some embodiments, to ensure the plurality of wiring ducts 100 are stackable, each of the plurality of wiring ducts 100 can have an opening length L1 at a mouth 132 that is greater than a length L2 across the first wall 112 between the second wall 114 and the third wall 116.

Figure 2:
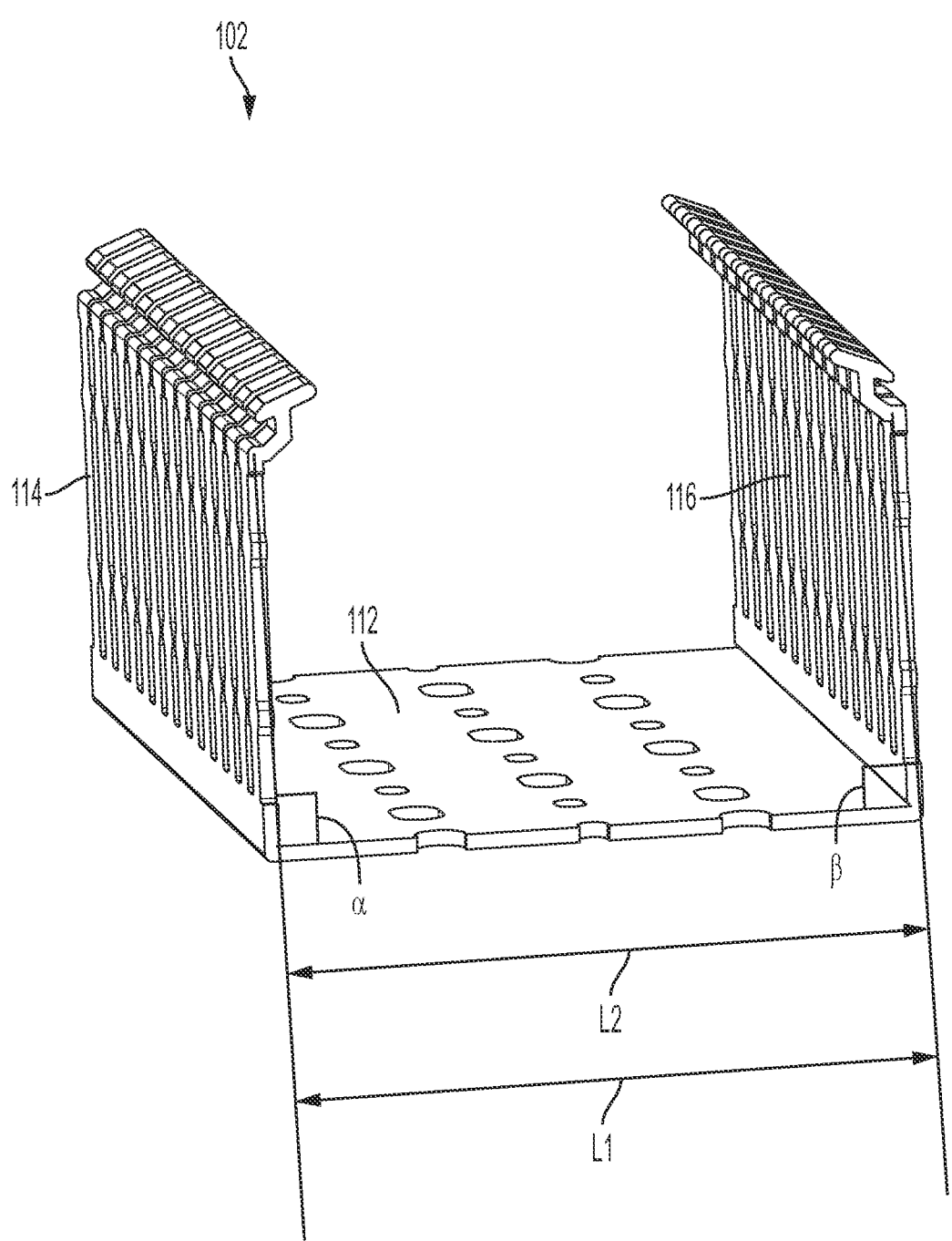
FIG. 2 shows a perspective view of a first wiring duct, according to some embodiments.

FIG. 2 shows a perspective view of the first wiring duct 102 of FIG. 1, according to some embodiments. In the illustrated embodiment, the first wiring duct 102 is in an installed configuration. That is, the first wiring duct 102 is secured within an enclosure such as, but not limited to, a control panel. In the installed configuration, the first wiring duct 102 is shown in a configuration in which the geometry is a three-sided box. As discussed above regarding FIG. 1, a cover can be installed on the first wiring duct 102 so that the configuration is box shaped. In some embodiments, the first wiring duct 102 is configured to flex between the uninstalled configuration and the installed configuration when fastened to an enclosure.

In the illustrated embodiment, the opening length L1 at the mouth 132 is substantially equal to the length L2 across the first wall 112. In some embodiments, "substantially equal" means subject to, for example, manufacturing tolerances or the like. In the installed configuration, an angle $\alpha$ between the first wall 112 and the second wall 114 is shown as being 90°. In the installed configuration, an angle $\beta$ between the first wall 112 and the second wall 114 is shown as being 90°. As such, in some embodiments, the second wall 114 is perpendicular to the first wall 112 in the installed configuration and the third wall 116 is perpendicular to the first wall 112 in the installed configuration. In some embodiments, in the installed configuration, the second wall 114 and the third wall 116 are parallel to each other. As shown above and in FIGS. 3-4 below, the angles $\alpha$ and $\beta$ vary from 90° when in the uninstalled configuration.

Figure 3:
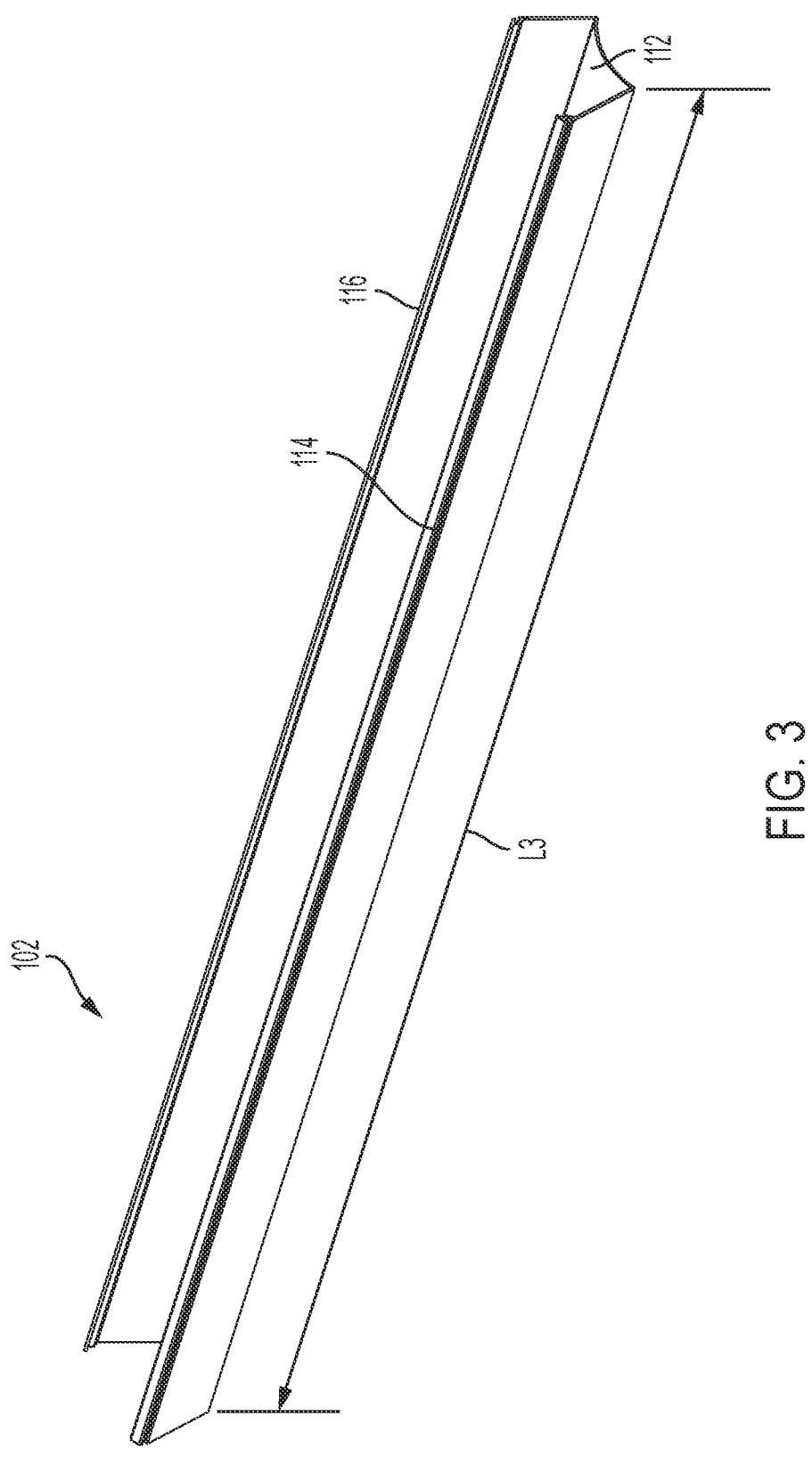
FIG. 3 shows a perspective view of the first wiring duct, according to some embodiments.
Figure 4:
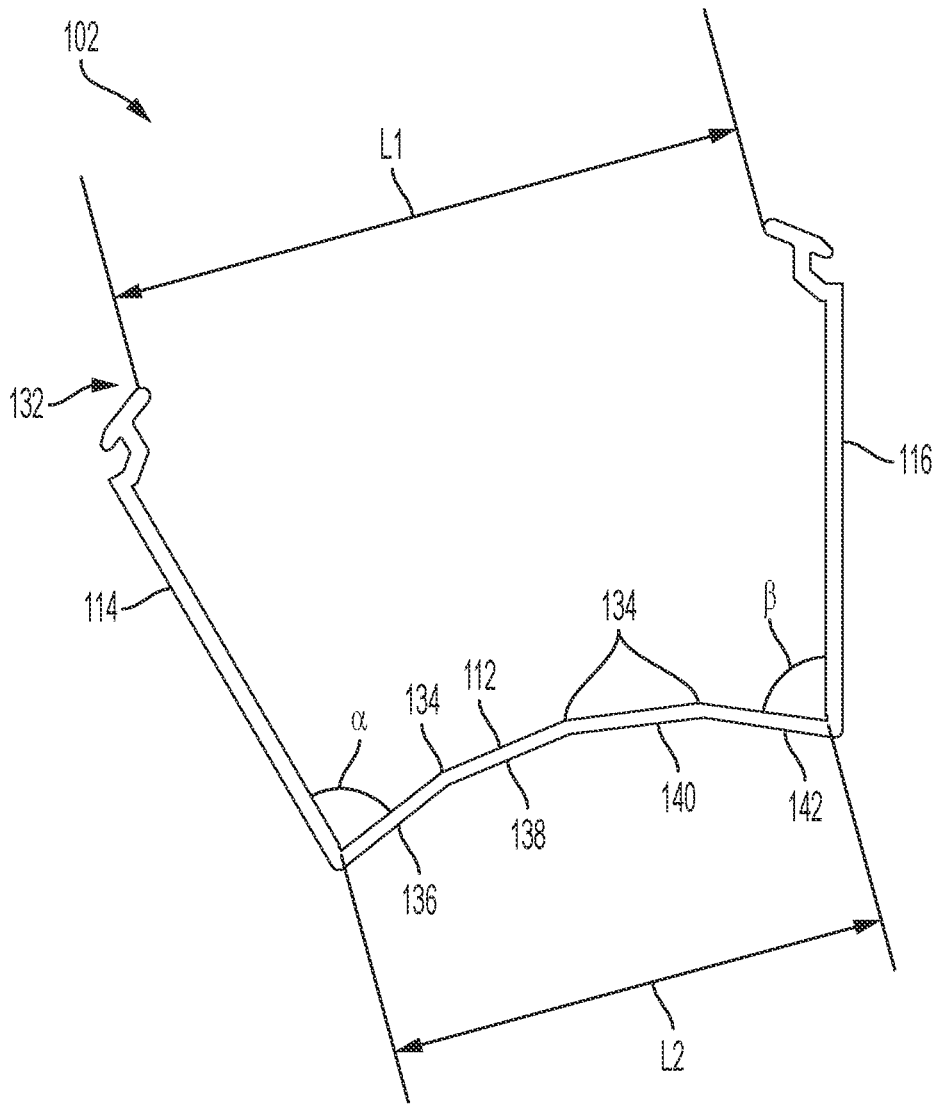
FIG. 4 shows a side view of the first wiring duct, according to some embodiments.

FIG. 3 shows a perspective view of the first wiring duct 102 of FIG. 1, according to some embodiments. FIG. 4 shows a side view of the first wiring duct 102 of FIG. 3, according to some embodiments. For simplicity of this Specification, a simplified version of the first wiring duct 102 is shown in FIG. 3 and in FIG. 4. In both of these figures, certain features of the first wall 112, the second wall 114, and the third wall 116 are not illustrated. It is to be appreciated that these features (as shown in FIG. 1 and in FIG. 2) can be included in the first wiring duct 102 as shown in FIG. 3 and FIG. 4. For simplicity of this Specification, FIG. 3 and FIG. 4 will be referenced collectively unless specific reference is made otherwise.

In some embodiments, the first wiring duct 102 has a major length L3. In some embodiments, the length L3 can be 6 feet. It is to be appreciated that the major length L3 can vary depending upon the implementation.

In some embodiments, the first wall 112 of the first wiring duct 102 can be formed in a dome shape. In some embodiments, the dome shape can be formed by including a plurality of bend lines 134 on the first wall 112. In such embodiments, when in the uninstalled configuration, the first wall 112 can appear to be divided into a first segment 136, a second segment 138, a third segment 140, and a fourth segment 142. It is to be appreciated that the first segment 136, the second segment 138, the third segment 140 and the fourth segment 142 are joined together at the plurality of bend lines 134. It is to be appreciated that the number of segments shown and described is an example and that fewer or additional segments can be included to accomplish the flexibility described in this disclosure.

In some embodiments, the opening length L1 at the mouth 132 is greater than the length L2 across the first wall 112. In some embodiments, "substantially equal" means subject to, for example, manufacturing tolerances or the like. In the illustrated embodiment, the angle α between the first wall 112 and the second wall 114 is shown as being less than 90°. In the installed configuration, the angle β between the first wall 112 and the second wall 114 is shown as being less than 90°. In some embodiments, the angles α and β can vary. In some embodiments, the angles α and β can be determined based on the configuration of the first wall 112 to create flexibility to transition from the uninstalled configuration to the installed configuration.

Figure 5:
FIG. 5 shows a perspective view of a wiring duct, according to some embodiments.
Figure 6:
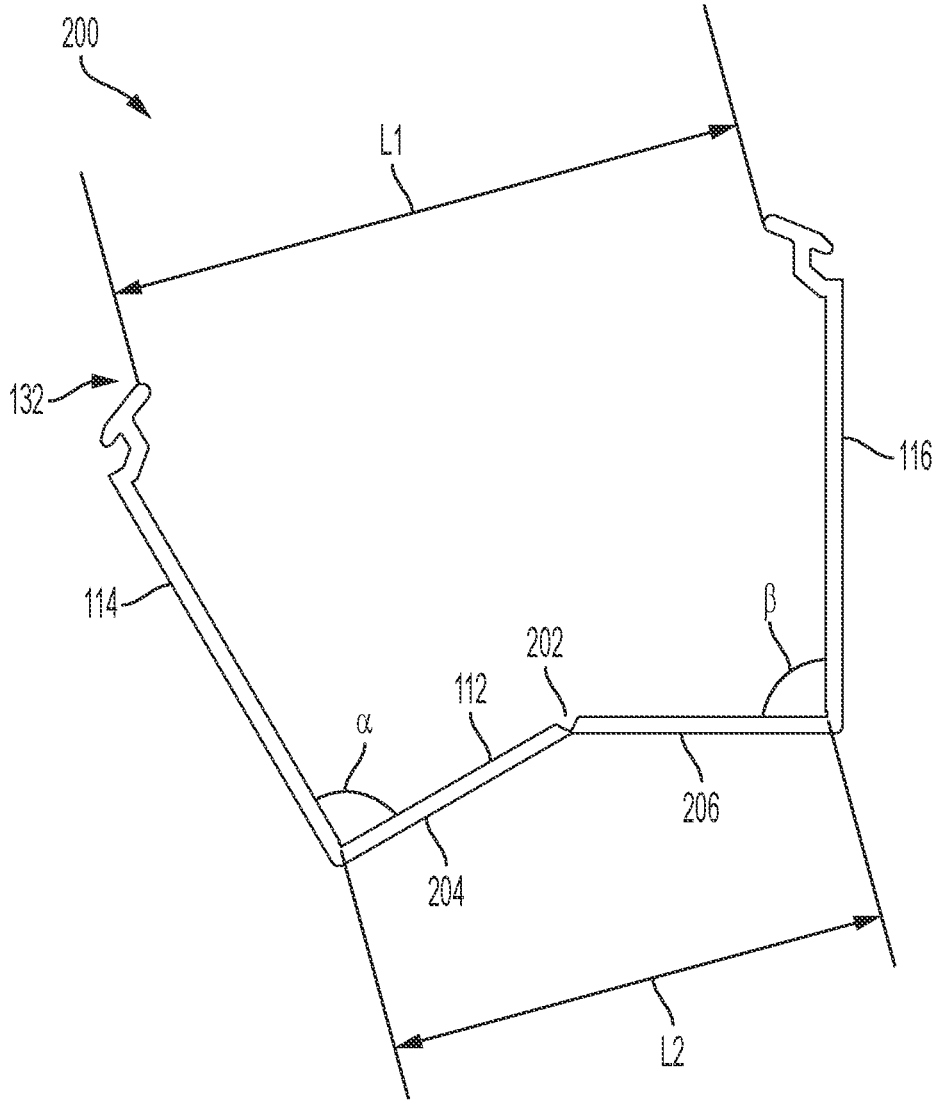
FIG. 6 shows a side view of the wiring duct of FIG. 5, according to some embodiments.

FIG. 5 shows a perspective view of a wiring duct 200, according to some embodiments. FIG. 6 shows a side view of the wiring duct 200 of FIG. 5, according to some embodiments. For simplicity of this Specification, a simplified version of the wiring duct 200 is shown in FIG. 5 and in FIG. 6. In both of these figures, certain features of the first wall 112 (FIG. 1), the second wall 114 (FIG. 1), and the third wall 116 (FIG. 1) are not illustrated. It is to be appreciated that these features (as shown in FIG. 1 and in FIG. 2) can be included in the wiring duct 200 as shown in FIG. 5 and FIG. 6. For simplicity of this Specification, FIG. 5 and FIG. 6 will be referenced collectively unless specific reference is made otherwise.

In some embodiments, the wiring duct 200 has a major length L4. In some embodiments, the major length L4 can be 6 feet. It is to be appreciated that the major length L4 can vary depending upon the implementation.

In some embodiments, the first wall 112 of the wiring duct 200 can be formed in an inverted V shape. In some embodiments, the inverted V shape can be formed by including a bend line 202 on the first wall 112. In some embodiments, to form the bend line 202, a portion of material forming the first wall 112 can be removed. It is to be appreciated that removing the material in this context can include a void in the manufacturing process so that the bend line 202 is created during the molding process without needing a subsequent manufacturing process to remove the material along the bend line 202. In such embodiments, when in the uninstalled configuration, the first wall 112 can appear to be divided into a first segment 204 and a second segment 206. It is to be appreciated that the number of segments shown and described is an example and that additional segments can be included to accomplish the flexibility described in this disclosure. Such a configuration is shown and disclosed in accordance with FIG. 7 and FIG. 8 below.

In some embodiments, the opening length L1 at the mouth 132 is greater than the length L2 across the first wall 112. In some embodiments, "substantially equal" means subject to, for example, manufacturing tolerances or the like. In the illustrated embodiment, the angle α between the first wall 112 and the second wall 114 is shown as being 90°. In some embodiments, the angles α and β can vary. In some embodiments, the angles α and β can be determined based on the configuration of the first wall 112 to create flexibility to transition from the uninstalled configuration to the installed configuration.

Figure 7:
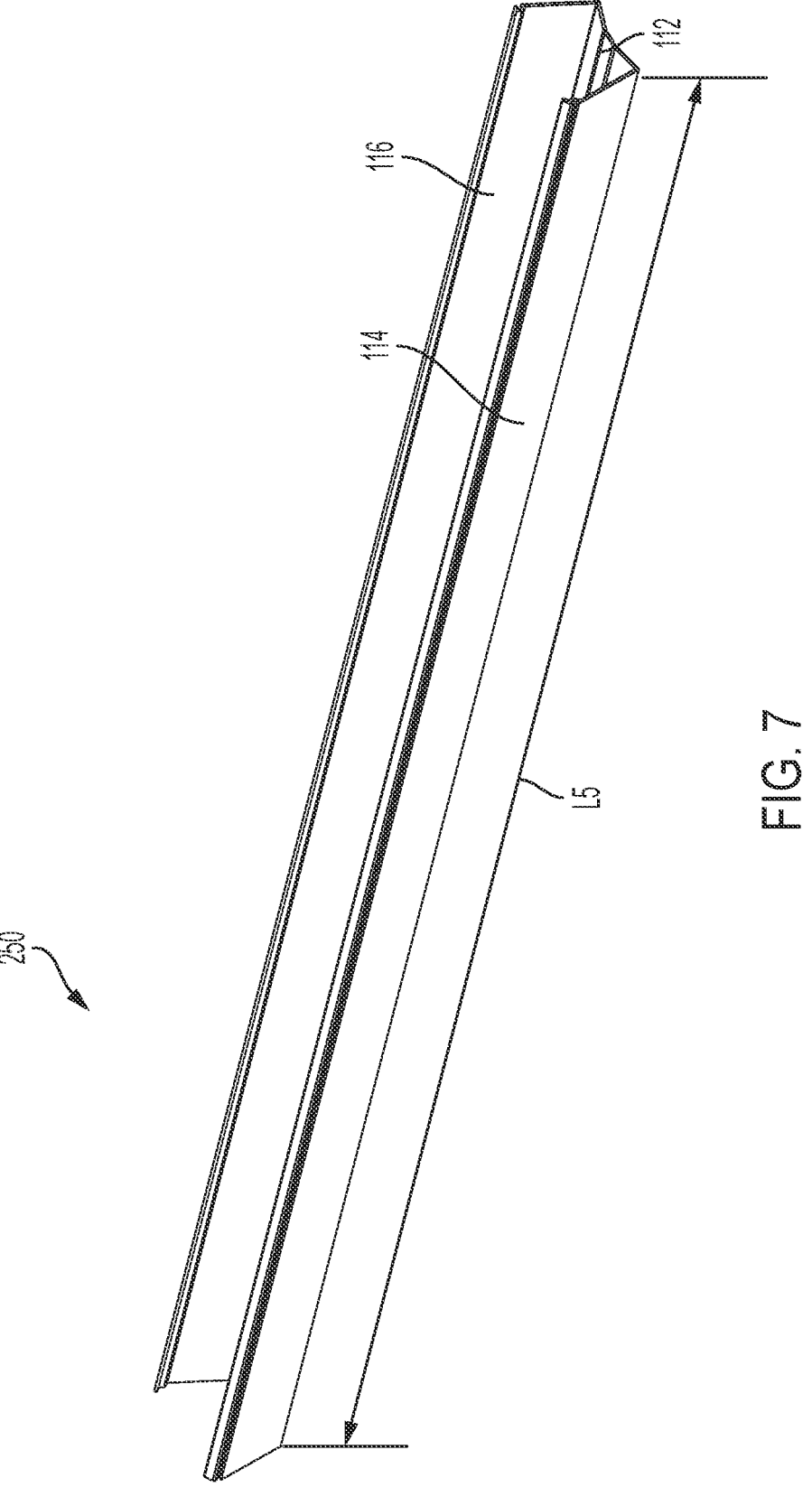
FIG. 7 shows a perspective view of a wiring duct, according to some embodiments.
Figure 8:
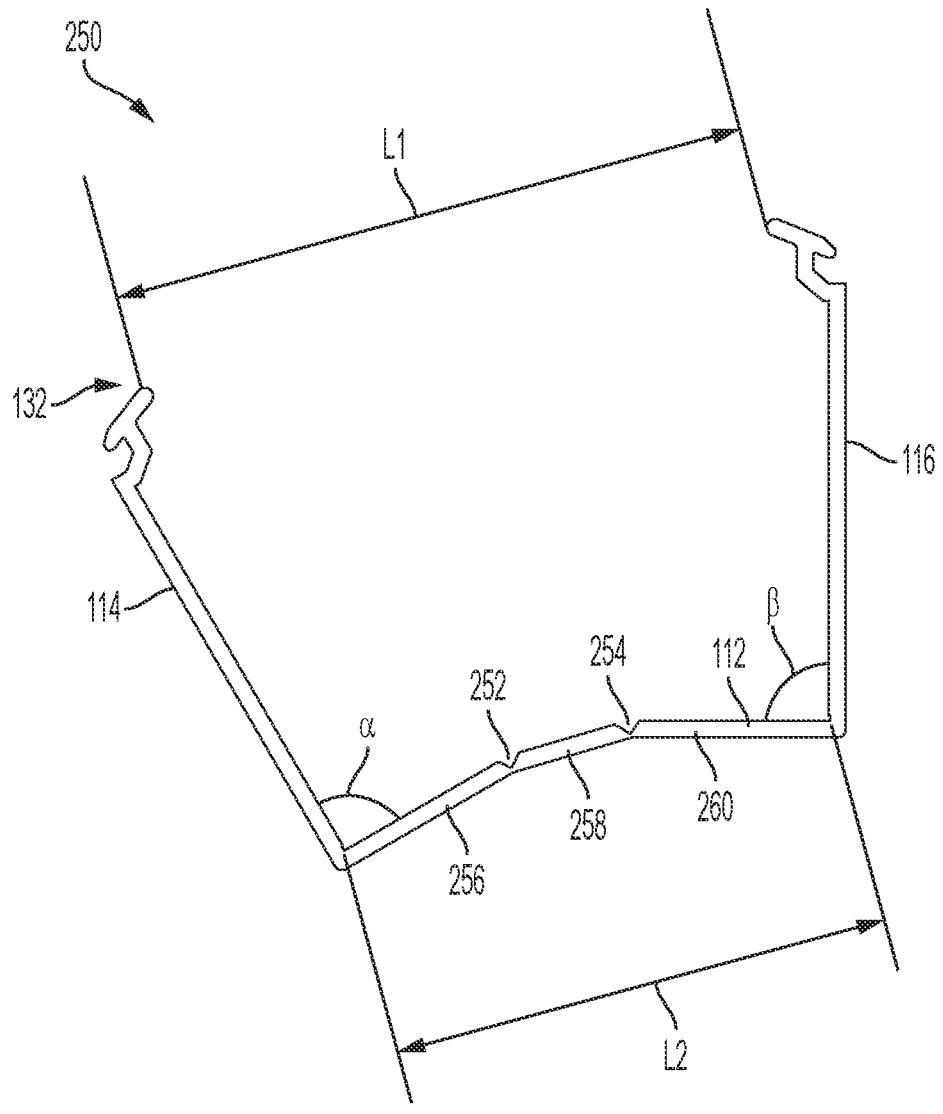
FIG. 8 shows a side view of the wiring duct of FIG. 7, according to some embodiments.

FIG. 7 shows a perspective view of a wiring duct 250, according to some embodiments. FIG. 8 shows a side view of the wiring duct 250 of FIG. 7, according to some embodiments. For simplicity of this Specification, a simplified version of the wiring duct 250 is shown in FIG. 7 and in FIG. 8. In both of these figures, certain features of the first wall 112 (FIG. 1), the second wall 114 (FIG. 1), and the third wall 116 (FIG. 1) are not illustrated. It is to be appreciated that these features (as shown in FIG. 1 and in FIG. 2) can be included in the wiring duct 250 as shown in FIG. 7 and FIG. 8. For simplicity of this Specification, FIG. 7 and FIG. 8 will be referenced collectively unless specific reference is made otherwise.

In some embodiments, the wiring duct 250 has a major length L5. In some embodiments, the major length L5 can be 6 feet. It is to be appreciated that the major length L5 can vary depending upon the implementation.

In some embodiments, the first wall 112 of the wiring duct 250 can be formed in a dome shape. In some embodiments, the dome shape can be formed by including a first bend line 252 on the first wall 112 and a second bend line 254 on the first wall 112. In some embodiments, to form the first bend line 252 and the second bend line 254, a portion of material forming the first wall 112 can be removed. It is to be appreciated that removing the material in this context can include a void in the manufacturing process so that the first bend line 252 and the second bend line 254 are created during the molding process without needing a subsequent manufacturing process to remove the material along the first bend line 252 or the second bend line 254. In such embodiments, when in the uninstalled configuration, the first wall 112 can appear to be divided into a first segment 256, a second segment 258, and a third segment 260. It is to be appreciated that the number of segments shown and described is an example and that additional segments can be included to accomplish the flexibility described in this disclosure.

In some embodiments, the opening length L1 at the mouth 132 is greater than the length L2 across the first wall 112. In some embodiments, "substantially equal" means subject to, for example, manufacturing tolerances or the like. In the illustrated embodiment, the angle α between the first wall 112 and the second wall 114 is shown as being 90°. In some embodiments, the angles α and β can vary. In some embodiments, the angles α and β can be determined based on the configuration of the first wall 112 to create flexibility to transition from the uninstalled configuration to the installed configuration.

Aspects: It is to be appreciated that any one of aspects 1-12 can be combined with any one of aspects 13-20.

Aspect 1. A duct for routing wires in an enclosure, comprising: a first sidewall including a first end and a second end opposite the first end; a second sidewall including a third end and a fourth end opposite the third end; and a back wall, wherein the back wall includes a plurality of segments joined together at one or more bend lines; wherein the first end extends from the back wall; wherein the third end extends from the back wall; wherein in an uninstalled configuration, a first length from the second end to the fourth end is greater than a second length from the first end to the third end.

Aspect 2. The duct of aspect 1, wherein the first sidewall, the second sidewall, and the back wall are formed of a single piece, unitary construction.

Aspect 3. The duct of any one of aspects 1 or 2, wherein in the uninstalled configuration, the back wall is in a dome shape.

Aspect 4. The duct of any one of aspects 1-3, wherein in the uninstalled configuration, the back wall is in an inverted V shape.

Aspect 5. The duct of any one of aspects 1-4, wherein in an installed configuration, the first length and the second length are equal.

Aspect 6. The duct of any one of aspects 1-5, wherein the back wall is flexible to transition from the uninstalled configuration to an installed configuration.

Aspect 7. The duct of aspect 6, wherein in the installed configuration, the first sidewall is perpendicular to the back wall and the second sidewall is perpendicular to the back wall.

Aspect 8. The duct of aspect 7, wherein in the installed configuration, the first sidewall is parallel to the second sidewall.

Aspect 9. The duct of any one of aspects 1-8, wherein the duct is made of a thermoplastic.

Aspect 10. The duct of any one of aspects 1-9, wherein the duct is made of a polyvinyl chloride (PVC), a halide free poly (p-phenylene oxide) (PPO), a halide free polyphenylene sulfide (PPS), or combination thereof.

Aspect 11. The duct of any one of aspects 1-10, wherein the first sidewall comprises a plurality of fingers.

Aspect 12. The duct of any one of aspects 1-11, wherein the second sidewall comprises a plurality of fingers.

Aspect 13. A duct for routing wires in an enclosure, comprising: a first sidewall including a first end and a second end opposite the first end; a second sidewall including a third end and a fourth end opposite the third end; and a back wall, wherein the back wall comprises a plurality of apertures configured to receive a fastener during installation of the duct; wherein the back wall is configured to flex between an uninstalled configuration and an installed configuration; wherein the first end extends from the back wall; wherein the third end extends from the back wall; wherein the first sidewall, the second sidewall, and the back wall are formed of a single piece, unitary construction; wherein in an uninstalled configuration, a first length from the second end to the fourth end is greater than a second length from the first end to the third end.

Aspect 14. The duct of aspect 13, wherein in the uninstalled configuration, the back wall is in a dome shape.

Aspect 15. The duct of any one of aspects 13 or 14, wherein in the uninstalled configuration, the back wall is in an inverted V shape.

Aspect 16. The duct of any one of aspects 13-15, wherein in an installed configuration, the first length and the second length are equal.

Aspect 17. The duct of any one of aspects 13-16, wherein the back wall is flexible to transition from the uninstalled configuration to an installed configuration.

Aspect 18. The duct of aspect 17, wherein in the installed configuration, the first sidewall is perpendicular to the back wall and the second sidewall is perpendicular to the back wall.

Aspect 19. The duct of aspect 18, wherein in the installed configuration, the first sidewall is parallel to the second sidewall.

Aspect 20. The duct of any one of aspects 13-19, wherein the duct is made of a thermoplastic.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

The invention claimed is:

1. A duct for routing wires in an enclosure, comprising:
a first sidewall including a first end and a second end opposite the first end;
a second sidewall including a third end and a fourth end opposite the third end; and
a back wall,
wherein the back wall includes a plurality of segments joined together at one or more bend lines;
wherein the first end extends from the back wall;
wherein the third end extends from the back wall;
wherein in an uninstalled configuration,
a first length of a gap between the second end and the fourth end is greater than a second length from the first end to the third end.

2. The duct of claim 1, wherein the first sidewall, the second sidewall, and the back wall are formed of a single piece, unitary construction.

3. The duct of claim 1, wherein in the uninstalled configuration, the back wall is in a dome shape.

4. The duct of claim 1, wherein in the uninstalled configuration, the back wall is in an inverted V shape.

5. The duct of claim 1, wherein in an installed configuration, the first length and the second length are equal.

6. The duct of claim 1, wherein the back wall is flexible to transition from the uninstalled configuration to an installed configuration.

7. The duct of claim 6, wherein in the installed configuration, the first sidewall is perpendicular to the back wall and the second sidewall is perpendicular to the back wall.

8. The duct of claim 7, wherein in the installed configuration, the first sidewall is parallel to the second sidewall.

9. The duct of claim 1, wherein the duct is made of a thermoplastic.

10. The duct of claim 1, wherein the duct is made of a polyvinyl chloride (PVC), a halide free poly(p-phenylene oxide) (PPO), a halide free polyphenylene sulfide (PPS), or combination thereof.

11. The duct of claim 1, wherein the first sidewall comprises a plurality of fingers.

12. The duct of claim 1, wherein the second sidewall comprises a plurality of fingers.

13. A duct for routing wires in an enclosure, comprising:
a first sidewall including a first end and a second end opposite the first end;

a second sidewall including a third end and a fourth end opposite the third end; and a back wall, wherein the back wall comprises a plurality of apertures configured to receive a fastener during installation of the duct;

wherein the back wall is configured to flex between an uninstalled configuration and an installed configuration;

wherein the first end extends from the back wall;

wherein the third end extends from the back wall;

wherein the first sidewall, the second sidewall, and the back wall are formed of a single piece, unitary construction;

wherein in an uninstalled configuration, a first length of a gap between the second end and the fourth end is greater than a second length from the first end to the third end.

14. The duct of claim 13, wherein in the uninstalled configuration, the back wall is in a dome shape.

15. The duct of claim 13, wherein in the uninstalled configuration, the back wall is in an inverted V shape.

16. The duct of claim 13, wherein in an installed configuration, the first length and the second length are equal.

17. The duct of claim 13, wherein the back wall is flexible to transition from the uninstalled configuration to an installed configuration.

18. The duct of claim 17, wherein in the installed configuration, the first sidewall is perpendicular to the back wall and the second sidewall is perpendicular to the back wall.

19. The duct of claim 18, wherein in the installed configuration, the first sidewall is parallel to the second sidewall.

20. The duct of claim 13, wherein the duct is made of a thermoplastic.

* * * * *